(12) United States Patent
Nassar et al.

(10) Patent No.: US 7,090,884 B2
(45) Date of Patent: Aug. 15, 2006

(54) METHOD AND COMPOSITION FOR PRODUCING FRENCH FRY POTATO PRODUCTS

(76) Inventors: Abdalla Elashmawi Nassar, 19029 Ibex Ave., Artesia, CA (US) 90701; Wesam Abdalla Nassar, 600 E. Ocean Blvd., #507, Long Beach, CA (US) 90802; M. Hatem Abdalla Nassar, 19029 Ibex Ave., Artesia, CA (US) 90701

(*) Notice: Subject to any disclaimer, the term of this patent is extended or adjusted under 35 U.S.C. 154(b) by 0 days.

(21) Appl. No.: 10/844,120

(22) Filed: Jan. 18, 2005

(65) Prior Publication Data
US 2006/0159835 A1 Jul. 20, 2006

(51) Int. Cl.
*A23L 1/216* (2006.01)
(52) U.S. Cl. .................. 426/550; 426/637
(58) Field of Classification Search .......... 426/550, 426/637
See application file for complete search history.

(56) References Cited
U.S. PATENT DOCUMENTS
4,834,996 A * 5/1989 Fazzolare et al. ........... 426/302
4,876,102 A * 10/1989 Feeney et al. .............. 426/550

* cited by examiner

*Primary Examiner*—Arthur L. Corbin
(74) *Attorney, Agent, or Firm*—Patenting Consulting Group; Roberto J. Rios

(57) ABSTRACT

A method is described for producing extruded French Fries-Style products from dough containing between 45% to 50% moisture, from 4% to 8% protein, and from 0.25% to 0.5% fibers. Said dough is composed of steam-peeled potatoes soaked beans, desired spices, flavors, colors, and fortified with vitamins and minerals.

The dough is pumped under vacuum to specific forming heads containing openings of desired shapes and dimensions. The continuous extrudate coming from said forming heads is received over a solid conveying belt traveling inside a steam-heated path at an adjusted speed to expose the extrudate to steam for a certain length of time to bring the temperature of the center of the extrudate from 140 to 190 degrees Fahrenheit. The extrudate is then received over a belt-conveyer traveling inside a freezing-tunnel where it is exposed to blasts of cooled air for a period of time to lower the temperature of the extrudate to 45 and degrees Fahrenheit or lower.

The extrudate is cut to desired length, then packaged and stored under blast freezing conditions.

5 Claims, 1 Drawing Sheet

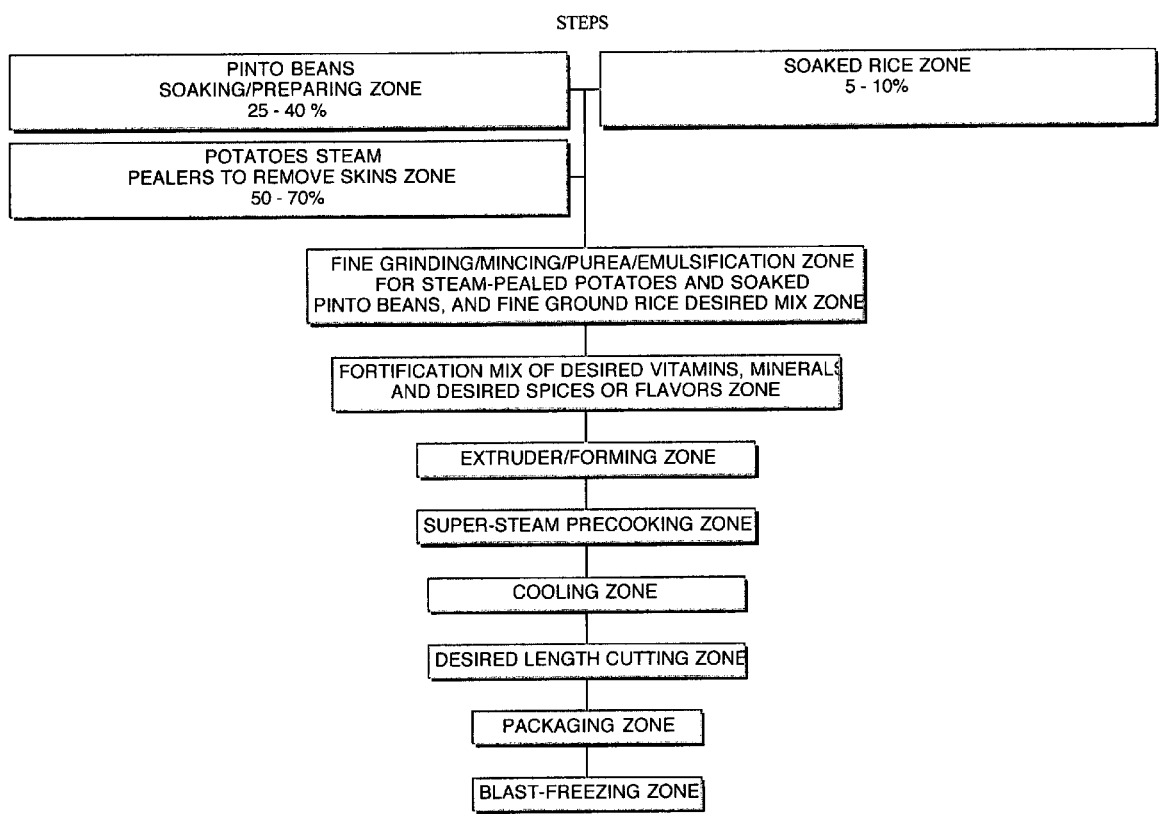

METHOD AND COMPOSITION FOR PRODUCING FRENCH FRY POTATO PRODUCTS

INTRODUCTION

A method of producing (extruded, steam precooked, and healthier-composed) frozen French Fries, having protein, vitamins, minerals, and a diversity of flavors and spices.

SUMMARY

This relates to a new way of producing French Fries by extrusion and steam precooking instead of cutting and oil frying, used in current French fry production. The advantages of this method when compared with the current method are:
1. The flexibility of the raw materials, since the type of potatoes does not have to be that particular one this being used now. All types of potatoes could be used by the new method.
2. Thus avoiding the cold storage of potatoes almost all-year-round.
3. The elimination of waste due to the fact that the pealed potato is used 100%
4. Eliminating the year-round cold storage of raw potatoes, thus avoiding waste caused by diseases, growing buds, mold, etc. In addition, saving the rather expensive costs.
5. All of the above must result in cost-reduction of producing existing French Fries
6. Healthier products due to the ability of fortifying the composition of potatoes and pinto beans, as a source of protein, with added, desired vitamins and mineral premixes.
7. A variety of flavors or spices to satisfy various markets.

BRIEF DESCRIPTION OF DRAWINGS

The FIGURE is a flow diagram of the process of preparing the French Fry product of the invention.

BACKGROUND

This invention relates to French Fries-Style products, which is similar to traditional French Fries only in appearance, however the following are some points of difference between the two products.
1. Healthier than traditional French Fries since it contains less fat, more protein, vitamins, and minerals as per desired.
2. Flexibility of having various flavors, spices and shapes and dimensions.
3. Cost per production unit is cheaper than that of traditional French Fries due to flexibility in using various types of fresh potatoes and also due to the addition of beans besides minimizing waste in expensive fresh potatoes.

BRIEF DESCRIPTION OF THE INVENTION

In this method of making French Fries-Style products, dough is prepared as follows:
To a suitable blender the following ingredients are added
1. Steam-peeled fresh potatoes, representing from about 60% to about 80% of total dough by eight.
2. Overnight soaked beans, emulsified, representing from about 20% to about 35% of total dough by weight.
3. Proteinaceous flours, representing from about 1% to about 2.5% of total dough by weight.
4. Modified food starches, representing from about 1% to about 2.5% of total dough by eight.
5. Micro-ingredients such as salt, colors, spices, flavors, vitamins, minerals, and suitable antioxidants agents.

All the above ingredients are blended well and pureed to become homogeneous dough which contains from about 45% to about 55% moisture. Said dough is pumped under vacuum to specific forming heads containing openings of desired shapes and dimensions to form continuous extrudate which falls over continuous, steam-heated belt running at an adjusted speed allowing the continuous extrudate to be partially cooked by live steam.

The inner temperature of the extrudate is maintained between 140 to 190 degrees Fahrenheit.

Exiting from the steam path, the partially cooked extrudate enter a cooling tunnel delivering freezing blast air, which dries the surface of the cooked extrudate cooling it down to about 40 degrees Fahrenheit, or lower.

The cold extrudate goes under adjusted speed cutting knifes to be cut at desired length. The cut pieces are packaged and blast-freeze to be stored under freezing conditions.

The invention claimed is:
1. A method for producing French Fries-Style food containing from about 40% to about 60% moisture, from about 4% to about 8% protein, from about 0.25% to about 0.5% fibers, comprising the steps of:
   producing a homogeneous dough by blending a mixture comprising from about 65% to about 80% by weight of fresh potatoes, from about 20% to about 35% by weight of at least one of: pinto beans, fava beans, garbanzo beans, or a combination thereof, from about 1% to about 2.5% by weight of modified food starch, from about 1.5% to about 2.5% by weight of at least one of proteinaceous flours, salt, spices, flavoring agents, coloring agents, vitamins, minerals, and antioxidant agents;
   pumping said homogeneous dough under vacuum into forming heads containing openings designed to deliver extrudate having shape and dimensions;
   receiving said extrudate on a continuous solid belt conveyor and transporting said extrudate inside a superheated live steam bath, wherein said extrudate is exposed to live steam for a length of time sufficient to partially cook said extrudate and bring the inner temperature of said extrudate to about 140° to about 190° Fahrenheit;
   substantially immediately cooling said partially cooked extrudate by subjecting it to blasts of air inside a cooling tunnel for a length of time sufficient to lower the inner temperature of said partially cooked extrudate to a temperature equal to or less than about 45° Fahrenheit; and
   cutting said cooled extrudate into small pieces with revolving knives; and then packaging said small pieces and storing said packaged pieces under freezing conditions.
2. The method according to claim 1, comprising steam-peeling said fresh potatoes to stop enzymatic activities and treating said steam-peeled potatoes with antioxidant agents prior to blending said mixture.
3. The method according to claim 1, comprising soaking said at least one of: pinto beans, fava beans, garbanzo beans, or a combination thereof in clean fresh water for a length of time and treating said soaked beans with mold inhibiting agents, emulsifying said soaked beans and adding said emulsified beans to said mixture for blending.

4. The method according to claim 1, wherein said proteinaceous flours comprise at least one of: soy protein concentrate, soy protein isolate, caseinate, albumen, or a combination thereof.

5. The method according to claim 1, wherein the surface of said solid belt conveyor is sprayed on its surface with an edible vegetable oil to prevent sticking of said extrudate.

* * * * *